United States Patent [19]
Jones et al.

[11] Patent Number: 5,284,190
[45] Date of Patent: Feb. 8, 1994

[54] SOIL DISTRIBUTION SYSTEM TO FACILITATE POTTING PLANTS

[75] Inventors: Dudley W. Jones; David T. McCoy, both of Cornelius, Oreg.

[73] Assignees: Thomas N. Tibbs; Julia M. Tibbs, both of Beaverton, Oreg.

[21] Appl. No.: 883,542

[22] Filed: May 15, 1992

[51] Int. Cl.$^5$ ............................................. A01C 11/00
[52] U.S. Cl. ............................ 141/129; 47/901; 47/1.01; 141/71; 141/391
[58] Field of Search ............ 141/391; 131, 134, 129, 141/71, 283; 47/1.01, 901, 1 A

[56] References Cited

U.S. PATENT DOCUMENTS

| | | |
|---|---|---|
| 1,545,376 | 7/1925 | Weatherby. |
| 2,749,006 | 6/1956 | Naruo ............................ 141/131 |
| 2,771,709 | 11/1956 | Ritter ............................ 41/1 A |
| 2,826,003 | 3/1958 | Oki et al. . |
| 2,884,022 | 4/1959 | Geary ............................ 47/901 |
| 2,993,625 | 7/1961 | Esval ............................ 141/131 |
| 3,587,675 | 6/1971 | Di Tucci et al. . |
| 3,782,033 | 1/1974 | Hickerson. |
| 4,159,727 | 7/1979 | Visser ............................ 47/901 |

FOREIGN PATENT DOCUMENTS

| | | | |
|---|---|---|---|
| 1959292 | 5/1971 | Fed. Rep. of Germany | ....... 47/1 A |
| 3424195 | 1/1986 | Fed. Rep. of Germany | ....... 47/1 A |

*Primary Examiner*—Henry E. Raduazo
*Attorney, Agent, or Firm*—Chernoff, Vilhauer, McClung & Stenzel

[57] ABSTRACT

There is disclosed an apparatus capable of providing a continuous source of soil to a level working surface and a vertically and horizontally adjustable conveyor system that transports planting pots proximate to the level working surface, so that an operator may efficiently scoop soil from the level working surface into the pot. The conveyor system is also used to collect and recycle spilled soil via a soil return hopper and a soil return elevator.

10 Claims, 5 Drawing Sheets

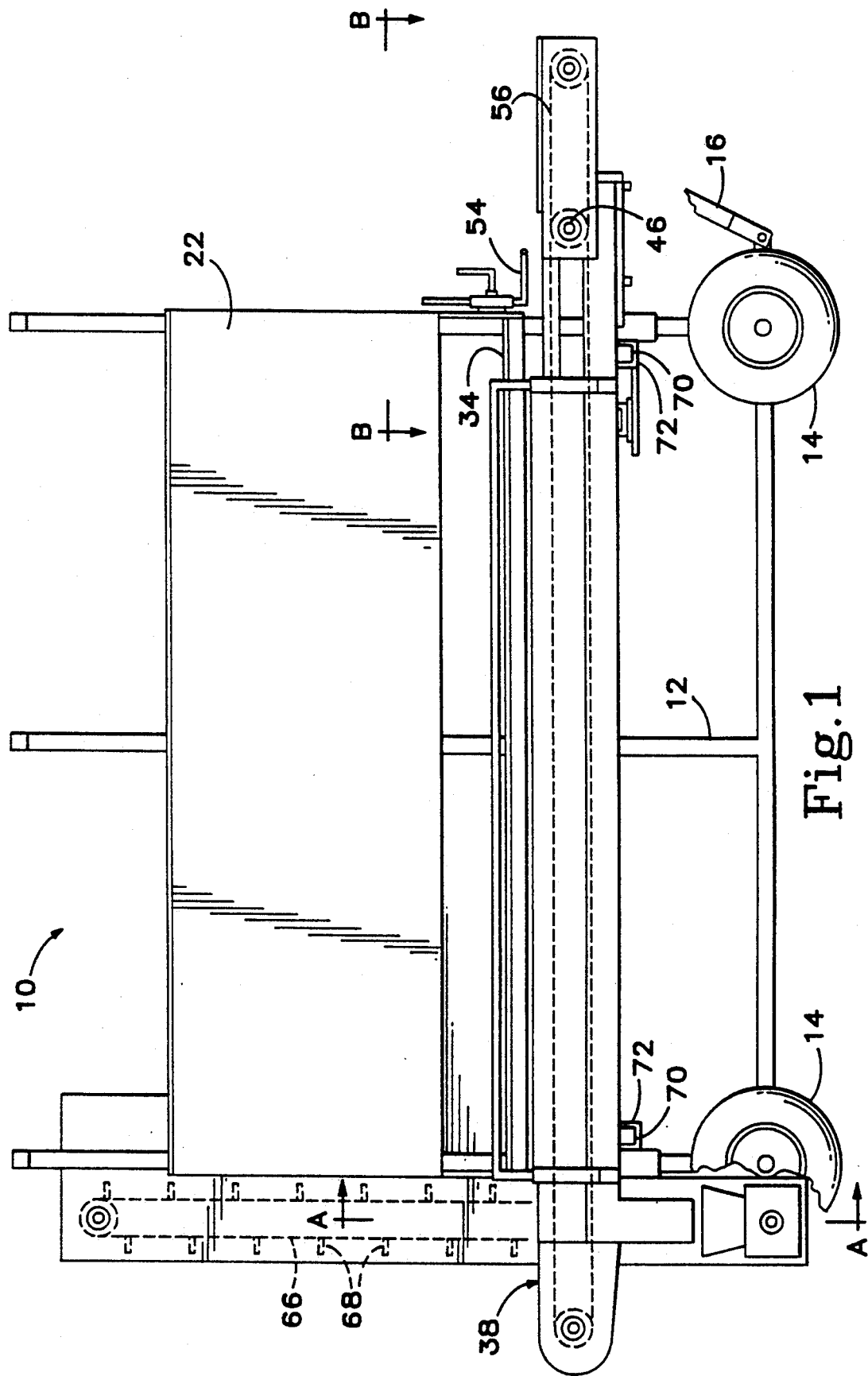

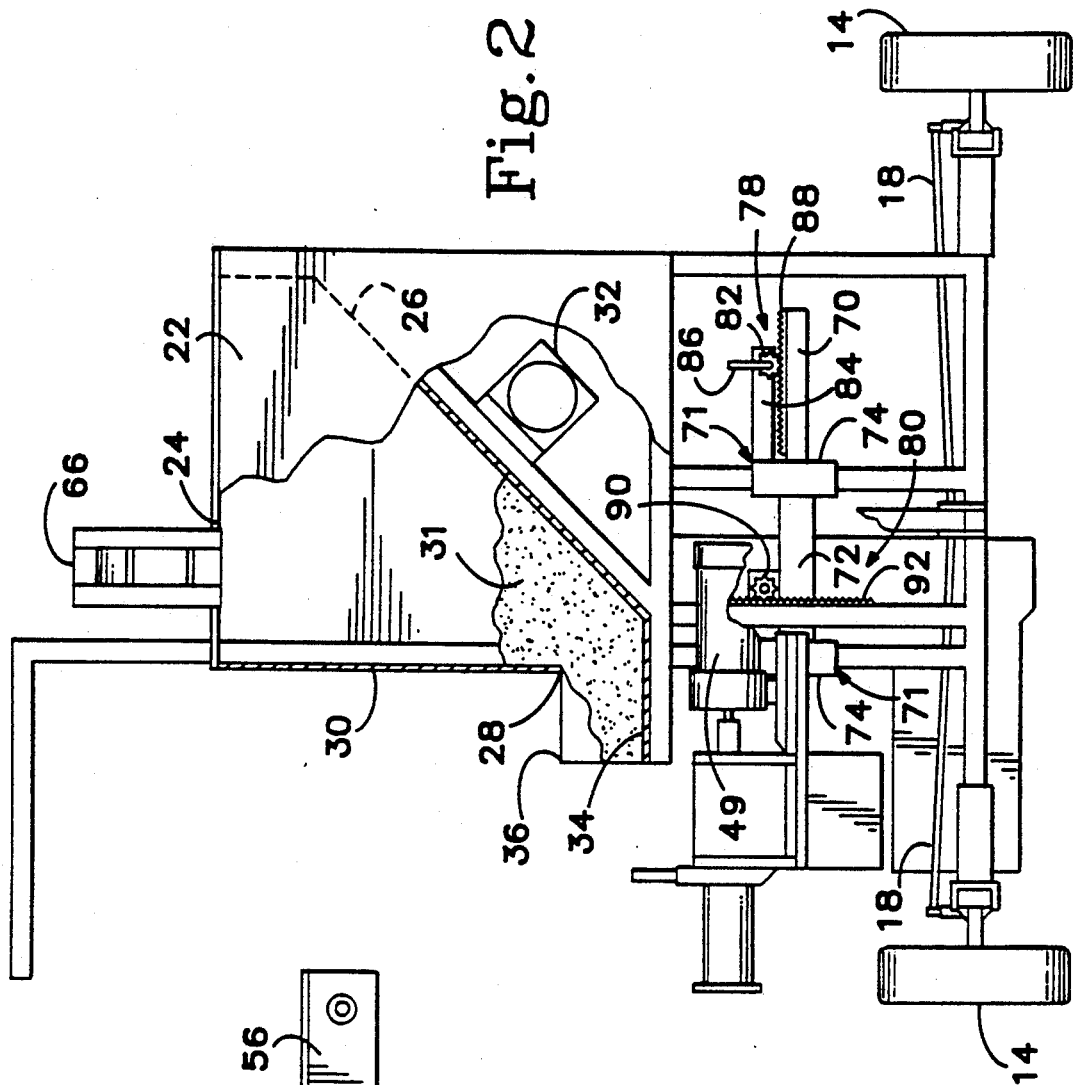
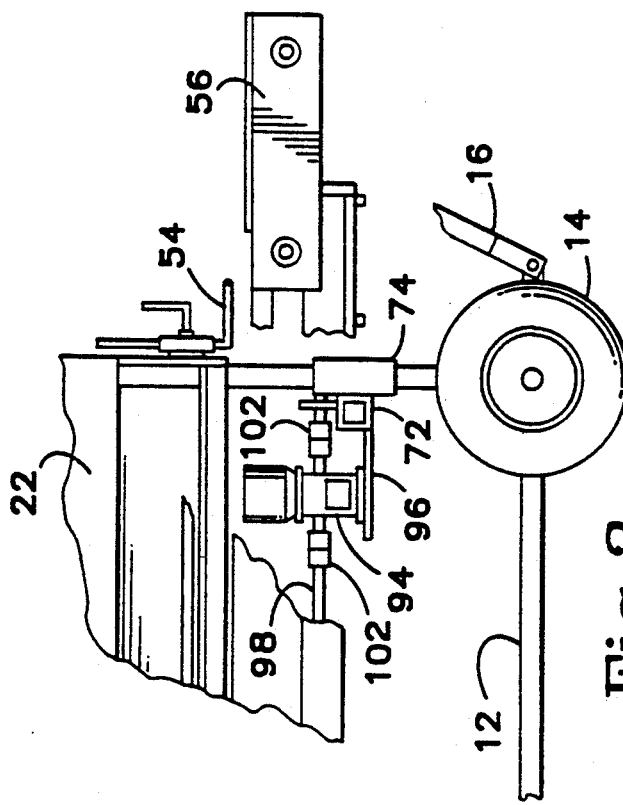

SOIL DISTRIBUTION SYSTEM TO FACILITATE POTTING PLANTS

BACKGROUND OF THE INVENTION

Potting plants in different pot and flat sizes is a time-consuming operation for commercial plant nurseries. It is therefore desirable to automate the process while retaining a high degree of adaptability to accommodate different sizes of plant receptacles. A number of plant potting machines are known which employ conveyor systems to move pots into position to receive soil and a soil distribution system comprising a hopper and either belts or buckets to move the dirt; examples include those disclosed in U.S. Pat. Nos. 2,826,003, 2,884,022, 3,587,675, and 3,782,033.

The prior art potting machines discussed above are all fairly complex, fully automated and expensive machines which produce a certain-sized pot filled with soil, which in some cases is partially excavated to receive a plant. The limitations inherent in such machines are their lack of adaptability for various-sized pots, their complexity, their size, and their expense.

Accordingly, it is a principal object of the present invention to provide a semiautomatic soil distribution apparatus that continuously provides soil to a working surface and transports pots in close proximity to the working surface so that soil may be readily manually scooped into the pots.

It is a further object of the present invention to provide a semiautomatic soil distribution apparatus for filling pots which uses a conveyor system that has the dual purposes of transporting pots past a working surface and transporting spilled soil to a soil return hopper where the soil is collected prior to being transported back into a main hopper and thereby recycled.

It is a further object of the present invention to provide a conveyor system for use in such a semiautomatic soil distribution system which is adjustable horizontally and vertically relative to a flat working surface so that the apparatus may be adapted to a range of sizes and shapes of pots and flats.

The foregoing and other objectives, features and advantages of the present invention will be more readily understood upon consideration of the following description of the invention taken in conjunction with the accompanying drawings.

SUMMARY OF THE INVENTION

The present invention comprises an apparatus that delivers soil to a generally horizontal elongate working surface and which transports pots or flats past the working surface to facilitate the task of potting plants. Transport of the pots or flats is achieved by a conveyor that is vertically and horizontally adjustable in close proximity to the working surface to provide optimum spatial relationship between the working surface and the soil receptacles. The conveyor mechanism also functions to return spilled soil to a soil hopper, thereby facilitating recycle of such excess soil.

BRIEF DESCRIPTION OF THE DRAWINGS

FIG. 1 is a front elevational view of a preferred embodiment of the present invention.

FIG. 2 is a side elevational, partially sectional view to reveal soil in a main hopper and agitation means attached to a rear-sloped wall of the main hopper.

FIG. 3 is a partial front elevation view with portions removed to show detail of a pinion drive.

DETAILED DESCRIPTION OF THE INVENTION

Figure 4:
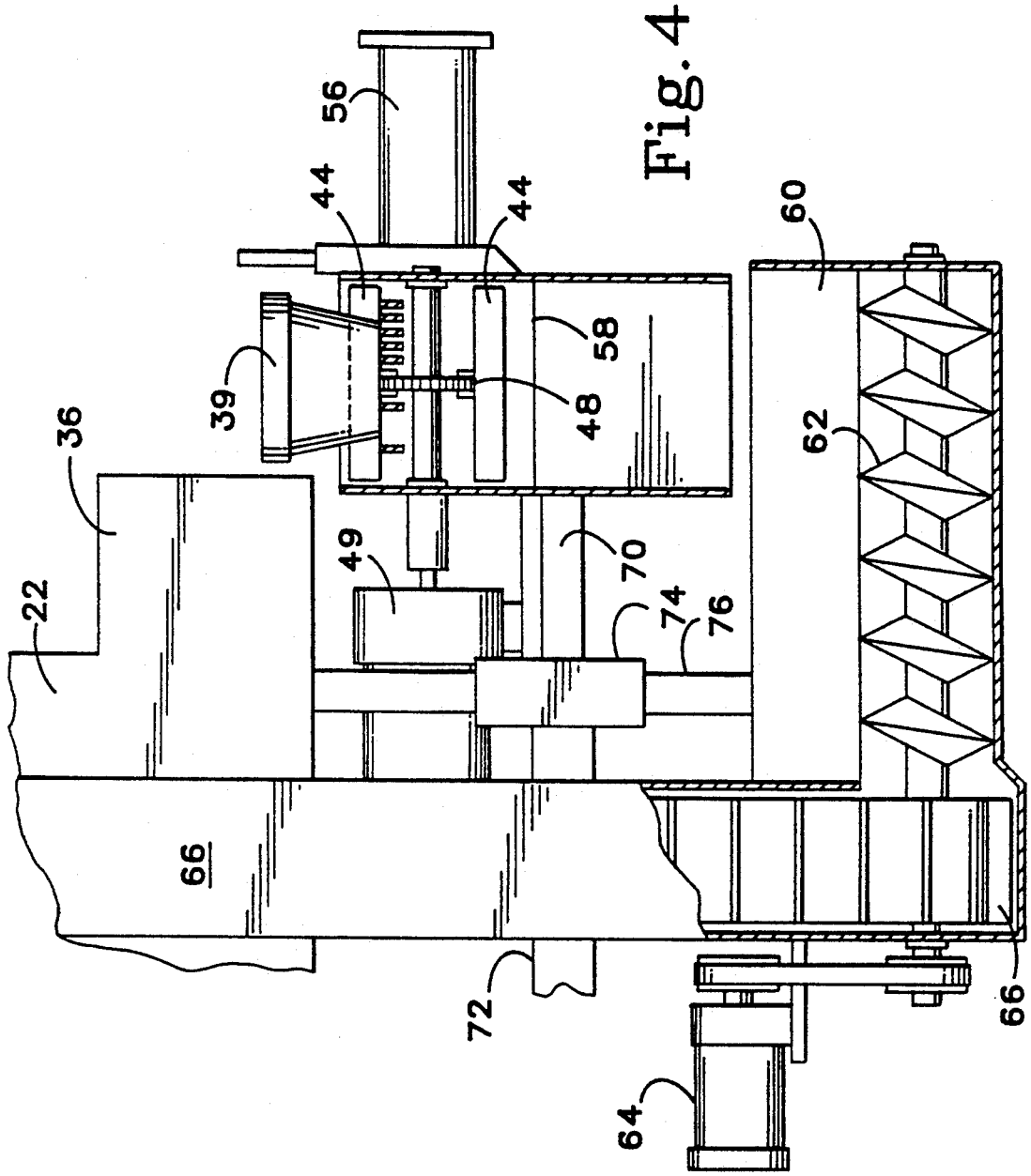
FIG. 4 is a cross-sectional view taken on line A—A of FIG. 1 showing auger and soil elevator detail.

The present invention overcomes the deficiencies of prior art devices by providing a simple, inexpensive semiautomatic apparatus that delivers potting soil to a level work surface and a fully adjustable conveyor system that transports pots past the work surface so that soil may be manually scooped into the pots. The conveyor's adjustability, both horizontally and vertically, allows the system to be adapted to a wide variety of sizes and shapes of pots and flats. The efficiency of the apparatus is further improved by also using the conveyor system for moving spilled soil for return to a soil hopper, thereby facilitating recycle of the spilled soil.

The apparatus of the present invention comprises a soil hopper mounted on a frame with wheels. The soil hopper has at least one sloped wall with a vibrator that agitates the soil, thereby urging the soil to the bottom of the hopper and out through the hopper's lower opening. Below the soil hopper is an elongate generally horizontal level working surface onto which soil is discharged from the soil hopper; preferably, this working surface comprises part of the soil hopper. A conveyor system runs the length of the work surface and is adjustable vertically and horizontally to provide optimum positioning between the working surface and the conveyor so as to accommodate a variety of pot and flat sizes and shapes. Spilled soil drops past the conveyor onto a tray. The conveyor is provided with an endless belt having a plurality of vanes or paddles or brushes, the vanes moving pots or flat and pushing spilled soil into a soil return hopper at the bottom of which is an auger, which in turn moves the soil into position so that it may be scooped up by a soil return elevator whereby it is transported upward and discharged back into the soil hopper.

Referring to the drawings, wherein like numerals indicate the same elements, and in particular to FIGS. 1 and 2, there is shown a preferred embodiment of the present invention, comprising a semiautomatic soil distribution and potting apparatus 10. A frame 12 is mounted on four wheels 14 with a hitch bar 16 and steering arms 18 that permit the apparatus to be towed. A brake may be provided (not shown) so that the wheels can be locked to prevent movement after the apparatus is at the work site. Mounted to the frame 12 is a soil hopper 22 which is open at its top 24 and has a rearwardly sloped wall 26 which slopes downward to an elongate discharge opening 28. In the preferred embodiment shown, the front wall 30 of the main hopper is vertical. However, it is to be understood that the front wall could have an orientation other than vertical and the soil hopper would still perform its intended function properly.

Soil hopper 22 is adapted to receive soil or soil mixtures 31 into its top opening 24 and discharge soil out through its lower opening 28. In addition, soil hopper 22 functions as a soil repository so that it may be refilled periodically. To assure that the soil in the soil hopper properly exits the lower opening 28, a vibrator 32 is provided which is attached to the sloped wall 26 and operates to agitate the soil, which, with the pull of gravity, urges the soil downwardly in the hopper and toward discharge at the lower opening 28. In a preferred embodiment the main hopper is fabricated from sheet steel.

Soil discharged from the soil hopper through its lower opening 28 is deposited onto a flat, level working surface 34 where it is available for workers to use for potting plants. The work surface 34 is elongate and preferably extends the entire length of the soil hopper. At each end of the working surface is a shield 36 which prevents soil from falling off the ends of the work surface. In a preferred embodiment best seen in FIG. 2, the level working surface 34 is an extension of the sloped wall 26 that has been adapted to extend below and beyond front wall 30.

Figure 5:
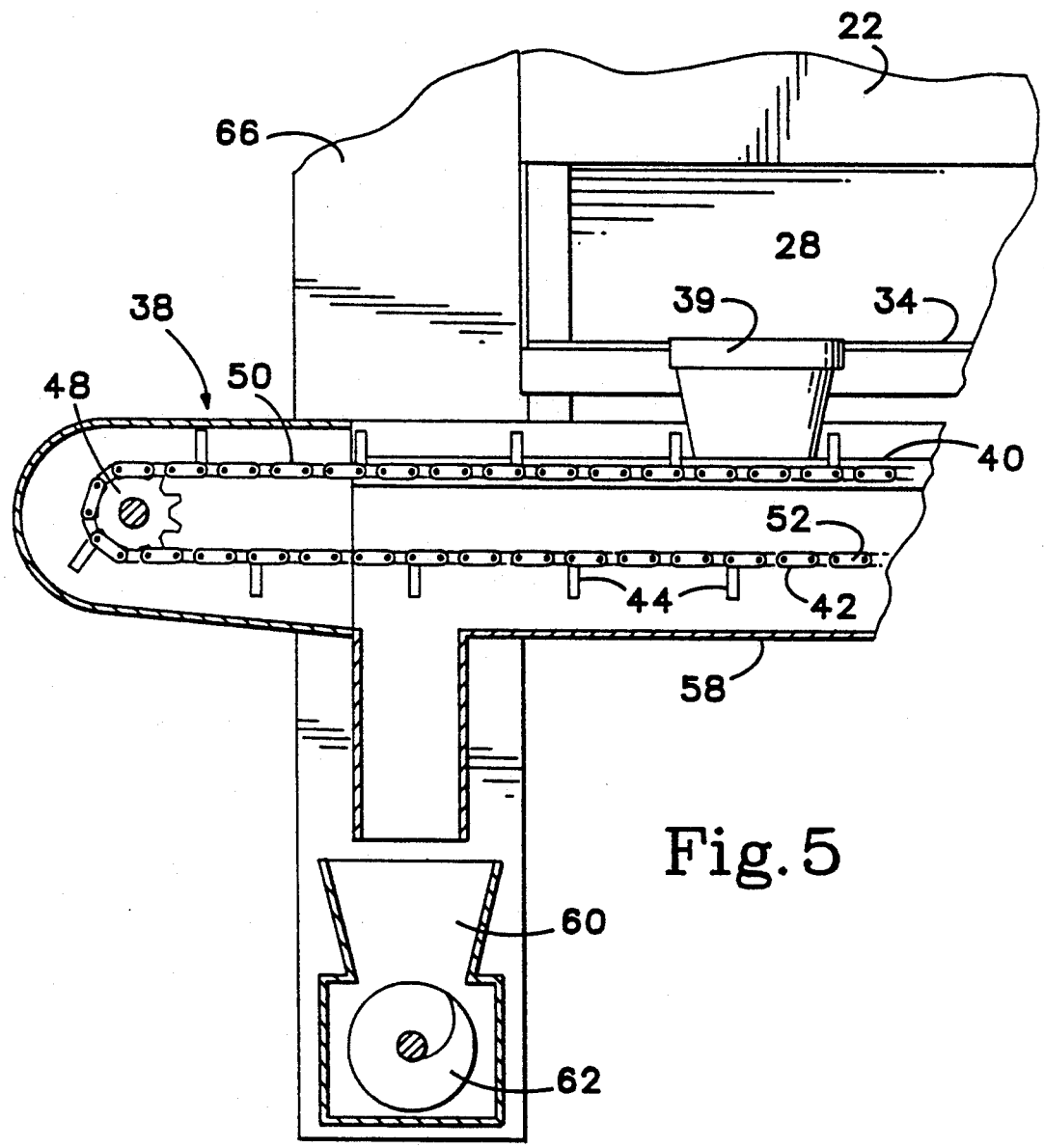
FIG. 5 is a front cross-sectional view showing endless belt and auger detail.
Figure 6:
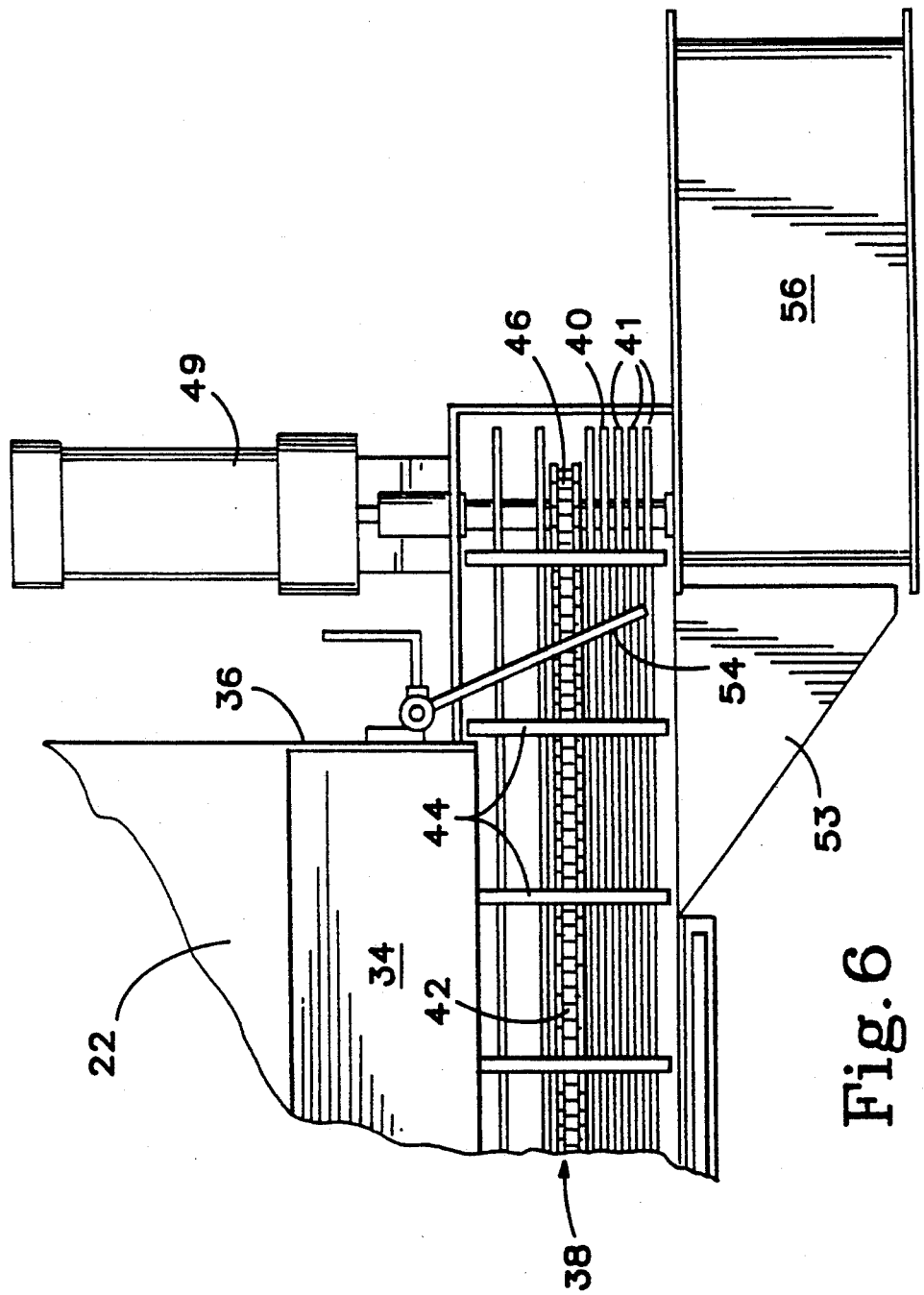
FIG. 6 is a plan view taken on line B—B showing drive, working surface and pot discharge detail.

Referring to FIGS. 4-6, there is shown a conveyor system 38 for the dual purposes of conveying pots 39 and removing and recycling spilled soil. The conveyor system comprises a stationary elongate platform 40 with a plurality of slats 41, an endless belt 42 that has a plurality of vanes 44 at evenly-spaced intervals, a drive cog 46, an idler cog 48 and a soil return tray 58. Endless belt 42 wraps around and interfaces with cogs 46, 48 and is driven by drive cog 46, which in turn is driven by conveyor motor 49. Belt tension is maintained either by adjustment of the distance between the idler cog and the drive cog or by a tensioning device (not shown). The belt has an upper portion 50 and a lower portion 52. The upper portion 50 of belt 42 is located between two of the slats 41 of elongate platform 40. The vanes 44 are attached to the belt and extend beyond an upper edge of elongate platform 40. In a preferred embodiment, the vanes extend in a straight line across the transverse direction of the elongate slatted platform. However, one of ordinary skill will appreciate that the vanes could be in a variety of configurations or sizes so as to accommodate different sizes and shapes of pots or flats. In use, pots 39 are placed upon elongate platform 40 and endless belt 42 is set into motion causing the pots to be engaged by vanes 44 so that the vanes urge the pots along the longitudinal direction of the elongate platform 40, thereby moving the pots past level working surface 34 so that soil may be scooped from working surface 34 into the nearby pots in an efficient manner.

Referring to FIGS. 3 and 6, as the filled pots 39 reach the end of the conveyor system at the drive cog 46, they are deflected by pot discharger 54 onto transfer surface 53 and then onto a secondary conveyor system 56 for further transport as desired. Still further conveyor lines could be installed to receive pots from secondary conveyor system 56 or a worker could be stationed at the end of the secondary conveyor system to remove pots and load or pack them.

Typically some of the soil intended as fill for the pots will miss its mark. Accordingly, it is desirable to provide a soil return system that automatically collects the spilled soil and returns it to the soil hopper. With particular reference to FIGS. 5 and 6 it may be seen that soil which misses pots 39 falls onto the conveyor system 38 and will fall through the openings between the slats 41 of elongate platform 40 and then onto elongate tray 58. Tray 58 extends the entire length of elongate platform 40 and is positioned immediately below the lower portion 52 of endless belt 42 so that soil which falls upon tray 58 is urged longitudinally along the tray by vanes 44. The vanes need not actually touch the surface of tray 58, since sufficient soil is returned even though the vanes ride up above the tray surface. At one end of tray 58 a soil return hopper 60 is provided that collects soil that has been pushed off the tray by the vanes. At the bottom of soil return hopper 60 is an auger 62 that is driven by soil return motor 64. As auger 62 is driven it moves soil away from soil return hopper 60 and delivers it to a soil return elevator 66 which accepts the soil into one of a plurality of lifting cups 68. The soil is conveyed upward in lifting cups 68 and deposited back into soil hopper 22. Soil return motor 64 also drives soil return elevator 66.

To accommodate different sizes and shapes of pots and flats the apparatus provides for the adjustment of conveyor system 38 relative to working surface 34. Main hopper 22 and working surface 34 are attached to the frame 12 and are not adjustable with respect to the frame or to the ground. However, conveyor system 38 may itself be adjusted both horizontally and vertically so that whatever pots are being filled may be optimally aligned with working surface 34 to provide close proximity of the pots to the working surface.

Before describing the means for the horizontal and vertical adjustment, it is necessary to describe how the conveyor system 38 is mounted to the frame 12. Referring to FIGS. 2 and 3, the conveyor system 38 is supported by two horizontal box beams 70 which are attached to the conveyor system. The box beams 70 are slidably connected to the frame 12 by means of a sleeve assembly 71 which consists of a horizontal sleeve 72 welded to two vertical sleeves 74. The horizontal sleeve 72 is an elongate section of a box beam that is oriented with its longitudinal axis horizontal and sized sufficiently to receive the box beam 70 within its hollow interior. Horizontal sleeve 72 is permanently attached (as by welding) to the two vertical sleeves 74, which are also sections of a box beam. The vertical sleeves are sized to fit over and slide along a pair of vertical support columns 76. Thus, the conveyor system can move horizontally by sliding the box beam 70 horizontally within the horizontal sleeve 72. The conveyor system 38 moves vertically along with the box beams 70 and sleeve assembly 71 by sliding vertical sleeves 74 along vertical support columns 76.

The conveyor system is moved in the horizontal and vertical directions by rack and pinion systems 78 and 80, respectively. Horizontal movement is controlled by rack and pinion system 78 wherein a horizontal pinion 82 is attached to and supported by a horizontal beam 84 which is attached to the horizontal sleeve. Attached to the horizontal pinion 82 is a pinion adjustment lever 86 which is used to rotate the horizontal pinion. A horizontal rack 88 is attached to the box beam 70 that supports the conveyor. When pinion adjustment lever 86 is turned, pinion 82 rotates and moves the rack and box beam horizontally, thereby adjusting conveyor system 38 horizontally.

The conveyor system 38 is adjusted vertically by vertical rack and pinion system 80, which includes a vertical pinion 90, a vertical rack 92, a vertical pinion gearbox 94 and a vertical pinion gearbox mount 96. Gearbox 94 and pinion 90 are connected to horizontal sleeve 72 by gearbox mount 96. Operation of vertical pinion gearbox 94 rotates vertical pinion 90, which then moves along vertical rack 92, thereby raising or lowering the combination of elements comprising sleeve assemblies 71, box beams 70 and conveyor system 38.

Rack and pinion systems for adjusting the vertical and horizontal movement of conveyor system 38 are provided at both ends of the soil distribution and potting apparatus. Both rack and pinions systems are preferably connected to each other by means of a connecting rod 98. The vertical pinion drive may be connected to the pinion and connecting rod 98 via universal joints 102, which permit the transmission of axial motion notwithstanding imperfect alignment of the axes.

The operation of the soil distribution and potting apparatus is quite simple. After the operator selects a pot or flat that is to be filled with soil and a plant, he or she adjusts the position of conveyor system 38 horizontally and/or vertically so that the top of the pot or flat will pass proximate to level working surface 34. Next, the operator places pots 39 on conveyor system 38, thereby moving them into position near level working surface 34. Conveyor system 38 may be stopped momentarily while the operator scoops soil into the pot along with the plant to be potted, and then restarted to urge the potted plant along slatted platform 40 until it reaches pot discharger 54 which deflects it off the conveyor. Soil that misses the pot falls through the slats of platform 40 onto tray 58 where vanes 44 on the lower portion 52 of the endless belt 42 sweep the soil into soil return hopper 60. Once in soil return hopper 60, auger 62 urges the soil toward and into lifting cups 68 where soil return elevator 66 lifts the soil and deposits it back into soil hopper 22.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. Apparatus for filling planting receptacles with soil and plants, comprising:
   (a) a soil hopper having an opening to receive soil and an elongate outlet to discharge soil;
   (b) a generally horizontal elongate stationary distribution surface arranged to receive soil discharged from said outlet, said distribution surface being integral with said soil hopper;
   (c) endless belt conveyor means for transporting plant receptacles, said endless belt conveyor means being oriented proximate to and parallel to said distribution surface; and
   (d) means for adjusting the position of said conveyor means relative to said distribution surface both horizontally and vertically.

2. The apparatus of claim 1 wherein said distribution surface is coextensive with said elongate outlet of said soil hopper.

3. The apparatus of claim 1 wherein said endless belt conveyor means comprises
   (a) an endless belt having a plurality of vanes located at spaced-apart positions thereon, and
   (b) an elongate tray disposed below said endless belt in a manner to receive any soil removed from said distribution surface that is not collected by the plant receptacles, wherein said tray is separated from said endless belt such that said vanes engage soil deposited on said tray.

4. The apparatus of claim 3, further comprising soil-returning means disposed below said elongate tray for receiving soil collected in said tray.

5. The apparatus of claim 4, further comprising a soil return elevator that receives soil from said soil-returning means and deposits said soil into said soil hopper.

6. The apparatus of claim 5, further comprising drive means for moving soil from said soil-returning means to said soil return elevator.

7. The apparatus of claim 6 wherein said drive means comprises an auger.

8. The apparatus of claim 1 wherein said soil hopper has at least one sloped wall.

9. The apparatus of claim 8, including agitation means for causing vibratory movement of said sloped wall.

10. The apparatus of claim 1, further comprising a frame, which supports said soil hopper, said distribution surface and said conveyor means, and wheels, and a steering mechanism associated with said frame.

* * * * *